May 23, 1933.     W. E. BELL     1,910,081
SWITCH CONTROLLING MECHANISM
Filed Feb. 20, 1931     2 Sheets-Sheet 1
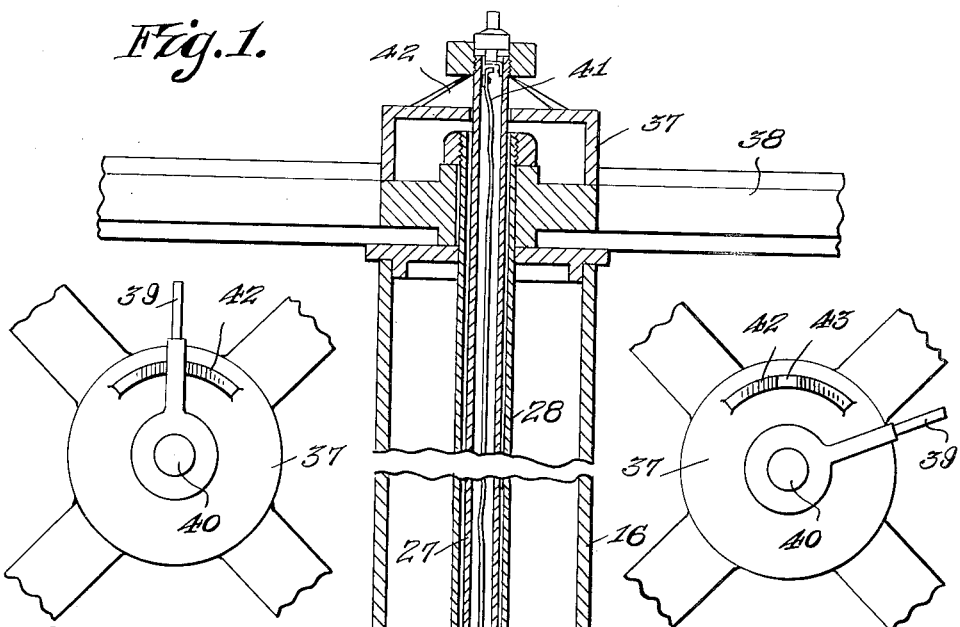
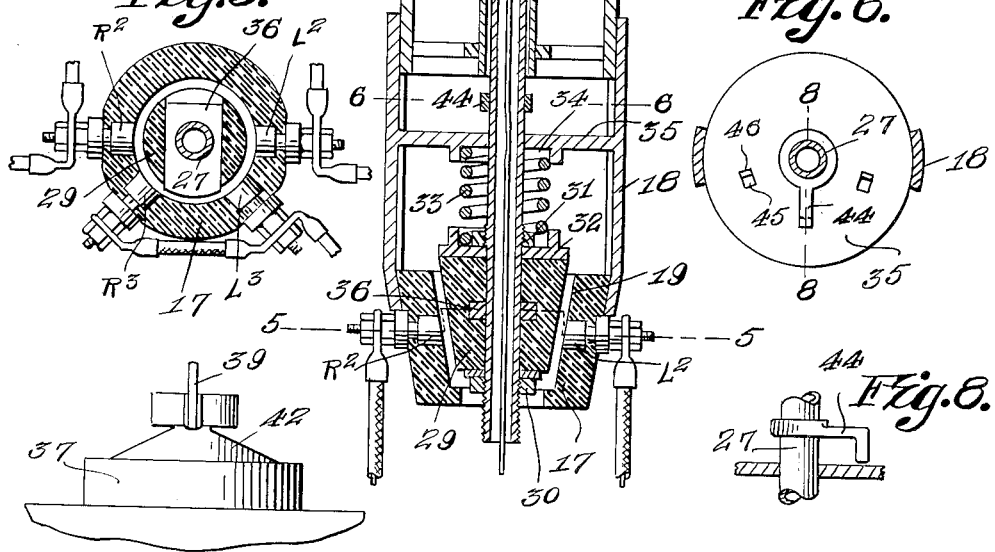
William E. Bell,
INVENTOR May 23, 1933. W. E. BELL 1,910,081
SWITCH CONTROLLING MECHANISM
Filed Feb. 20, 1931 2 Sheets-Sheet 2
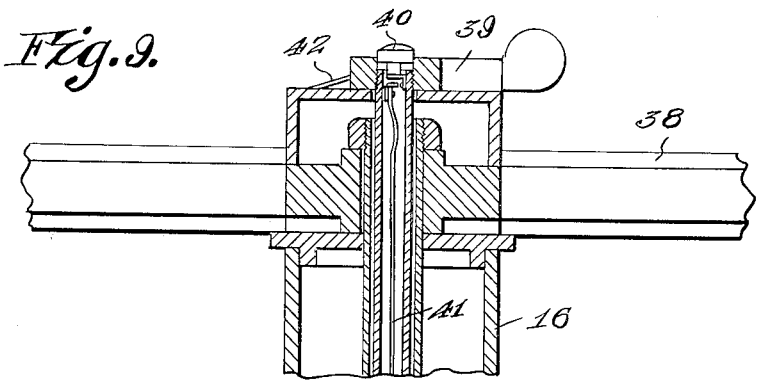
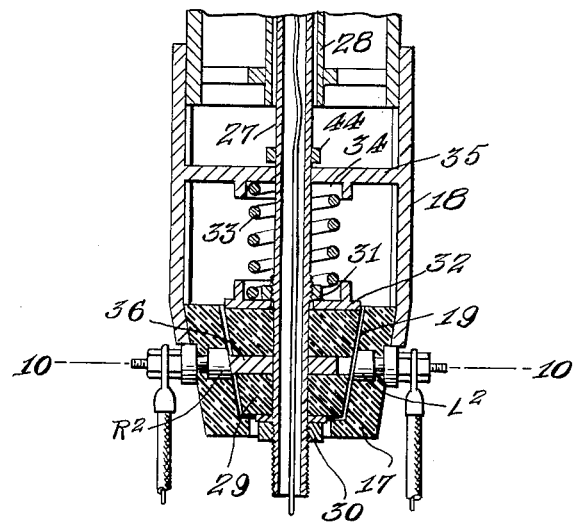
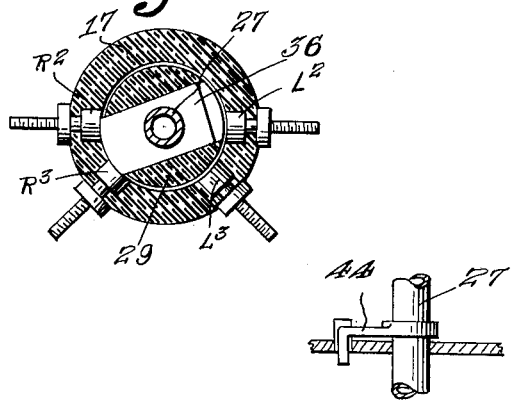
William E. Bell,
INVENTOR
BY A. L. Evans
ATTORNEY Patented May 23, 1933

1,910,081

UNITED STATES PATENT OFFICE

WILLIAM E. BELL, OF HONOLULU, TERRITORY OF HAWAII, ASSIGNOR OF ONE-HALF TO L. L. McCANDLESS, OF HONOLULU, HAWAII

SWITCH CONTROLLING MECHANISM

Application filed February 20, 1931. Serial No. 517,370.

This invention relates to direction signals for automobiles and has especial relation to means for controlling the signals, an object being to provide means for manually setting the signal in advance of making a turn, and for automatically restoring the signal to its normally inactive position when the turn has been made.

Another object of the invention is the provision of means for accomplishing the above purposes, which are mounted upon and housed within the steering column so that they will be out of the way and therefore protected against accidental contact and damage.

Another object of the invention is the provision of means of the above character which are simple and inexpensive in construction, may be readily installed, and will be readily accessible for inspection and repair.

With the above and other objects in view, the invention further includes the following novel features and details of construction, to be hereinafter more fully described, illustrated in the accompanying drawings and pointed out in the appended claims.

In the drawings:—

Figure 1 is a fragmentary vertical sectional view taken longitudinally through the steering column of an automobile and illustrating the invention.

Figure 2 is a sectional view on the line 2—2 of Figure 11.

Figure 3 is a top plan view of the steering wheel showing the operating lever in normal position.

Figure 4 is a like view showing the operating lever in position to indicate a right turn.

Figure 5 is a sectional view on the line 5—5 of Figure 1.

Figure 6 is a sectional view on the line 6—6 of Figure 2.

Figure 7 is a fragmentary elevation showing the steering column cap and the signal control lever.

Figure 8 is a fragmentary section taken substantially on the line 8—8 of Figure 6.

Figure 9 is a view similar to Figure 2 but showing the switch closed.

Figure 10 is a section on the line 10—10 of Figure 9.

Figure 11 is a view similar to Figure 6 with the parts in the position assumed when the switch is closed.

The present invention provides means for controlling the right or left signal lamps, and for this purpose the lower end of the steering column 16 of the automobile has secured therein an insulating block 17. This block may be secured directly within the bottom of the steering column 16, or it may be secured within the bottom of an extension 18 which is carried at the lower end of the steering column, and this extension may be suitably attached so as to be readily removable or attachable for the purpose of inspection and repair. The block 17 is provided with a central tapered bore 19 and embedded in the block are spaced pairs of contacts L2 and L3 and R2 and R3. The contacts L3 and R3 are connected to one terminal of a source of supply, such as a battery, while the contacts L2 and R2 are designed for connection to the left and right signal lights respectively.

In order to selectively bridge the contacts R2 and R3 and the contacts L2 and L3, a hollow rod 27 extends downward through the steering post 28 of the automobile and has secured to its lower end an insulated block 29 which is tapered in conformity with the taper of the bore 19 of the block 17. The rod 27 is threaded for the reception of clamping nuts 30 and 31, which hold the block 29 in place, while the nut 31 also serves to clamp in place a socketed washer 32 which receives one end of a coil spring 33. The opposite end of this spring is received within a socket 34 provided upon the under side of a partition 35, the latter extending transversely of the steering column extension 18. As the rod 27 is capable of longitudinal movement within the steering post, the tendency of the spring 33 will be to force the rod downward within the tapered bore 19 of the block 17. The block 19 has embedded therein a contact member 36, and this member is of sufficient width to bridge either the contacts R2 and R3 or the contacts L2 and L3.

The rod 27 extends upward through the steering column cap 37 which is mounted upon the top of the steering wheel 38 of the automobile, and this rod has rigidly attached thereto an operating lever 39. The usual horn button 40 is mounted in the attached end of the lever 39 and is adapted to make and break contact with the conductor 41 which extends downwardly through the hollow post 27 and is connected in the horn circuit in the usual manner.

The lever 39 is provided for the purpose of selectively positioning the contact member 36 to bridge either pair of contacts and light the lamps upon either side of the automobile, and in order to light the lamps L and L', the lever is moved to the right as shown in Figure 4 of the drawings. Conversely, the lever is moved to a similar position at the left to close a circuit through the lamps R and R'. In Figure 11, the contact 36 is shown as bridging the contacts R2 and R3 to close a circuit through the lamps R and R'.

Mounted upon the cap 37 is a two way cam 42 and this cam is provided with a central notch 43 which is adapted to receive the lever 39. When the lever is positioned within this notch as shown in Figure 3 of the drawings, the contact member 36 will be in neutral position, or in the position shown in Figure 5, which is the normal position of the switch. When the lever 39 is in this position, the insulated block 29 which carries the contact member 36 will be raised, due to the fact that the bottom of the notch 43 is spaced above the top of the cap 37. This will act to space the block 29 from the block 17. When the lever 39 is moved either to the right or left, the spring 33 will force the block 19 downward so that the contact member 36 may be engaged with either pair of stationary contacts, depending upon the direction of movement of the lever.

Secured to and extending from the rod 27 is a substantially L-shaped finger 44. This finger is spaced above the partition 35 and the latter is provided with spaced openings 45 and upstanding lugs 46 which are arranged at one end of the openings. When the lever is moved to render the signal device active, the finger 44 will engage one of the lugs 46 and as the rod 27 moves downward under the action of the spring 33, the finger will be forced into one of the openings 45, and rotation of the rod 27 will be prevented until the rod is again raised. The signals will thus remain active as long as the automobile travels straight ahead, but when the steering wheel is rotated to make a turn, the cam 42 will be forced beneath the lever 39 and the latter will be raised. This upward movement of the lever will disengage the finger 44 from the opening 45 and will also disengage the contact 36 from the pair of contacts previously engaged, so that a circuit through the lamps will be interrupted. The finger 44 will thus not only serve as a stop to properly position the contact 36, but will also serve to hold the contacts positively engaged so that the lamps will be properly illuminated until cut out by the operation of the steering wheel in making a turn.

The invention is susceptible of various changes in its form, proportions and minor details of construction and the right is herein reserved to make such changes as properly fall within the scope of the appended claims.

Having described the invention what is claimed is:—

1. A control mechanism for automobile signals comprising a longitudinally and angularly movable rod for mounting in the steering column of a motor vehicle, a spring normally impelling the rod downwardly, a block carried at the lower end of the rod, stationary contacts for inclusion in a signalling circuit, a contact member carried by said block and engageable with the stationary contacts in the depressed position of the rod and certain angular positions of the same, a steering wheel carried cam, and a lever carried at the upper end of the rod, the cam being engageable under the lever in movement of the steering wheel to elevate the rod and disengage the block carried and stationary contacts.

2. A control mechanism for automobile signals comprising a longitudinally and angularly movable rod for mounting in the steering column of a motor vehicle, a spring normally impelling the rod downwardly, a block carried at the lower end of the rod, stationary contacts for inclusion in a signalling circuit, a contact member carried by said block and engageable with the stationary contacts in the depressed position of the rod and certain angular positions of the same, a steering wheel carried cam, and a lever carried at the upper end of the rod, the cam being engageable under the lever in movement of the steering wheel to elevate the rod and disengage the block carried and stationary contacts, the lever being swingable either right-handedly or left-handedly to engage the block carried contact with one or the other of the stationary contacts and the cam having anticlined camming surfaces extending from a point below the lower edge of the lever in the lowered position of the rod.

3. A control mechanism for automobile signals comprising a longitudinally and angularly movable rod for mounting in the steering column of a motor vehicle, a spring normally impelling the rod downwardly, a block carried at the lower end of the rod, stationary contacts for inclusion in a signalling circuit, a contact member carried by said block and engageable with the stationary contacts in the depressed position of the rod and certain angular positions of the same, a steering wheel carried cam, and a lever carried at the upper end of the rod, the cam being engageable under the lever in movement of the steering wheel to elevate the rod and disengage the block carried and stationary contacts, the lever being swingable either right-handedly or left-handedly to engage the block carried contact with one or the other of the stationary contacts and the cam having anticlined camming surfaces extending from a point below the lower edge of the lever in the lowered position of the rod, and a notch defining a lever seat at the peak of said camming surfaces.

4. A control mechanism for automobile signals comprising a longitudinally and angularly movable rod for mounting in the steering column of a motor vehicle, a spring normally impelling the rod downwardly, a block carried at the lower end of the rod, stationary contacts for inclusion in a signalling circuit, a contact member carried by said block and engageable with the stationary contacts in the depressed position of the rod and certain angular positions of the same, a steering wheel carried cam, and a lever carried at the upper end of the rod, the cam being engageable under the lever in movement of the steering wheel to elevate the rod and disengage the block carried and stationary contacts, the rod being provided with latching means in engaging positions of the block carried and stationary contacts to prevent angular or turning movement from such contact engaging position but to permit contact disengagement by axial movement of the rod.

In testimony whereof I affix my signature.

WILLIAM E. BELL.